J. F. STEWARD.
Mowers.
No. 197,500. Patented Nov. 27, 1877.
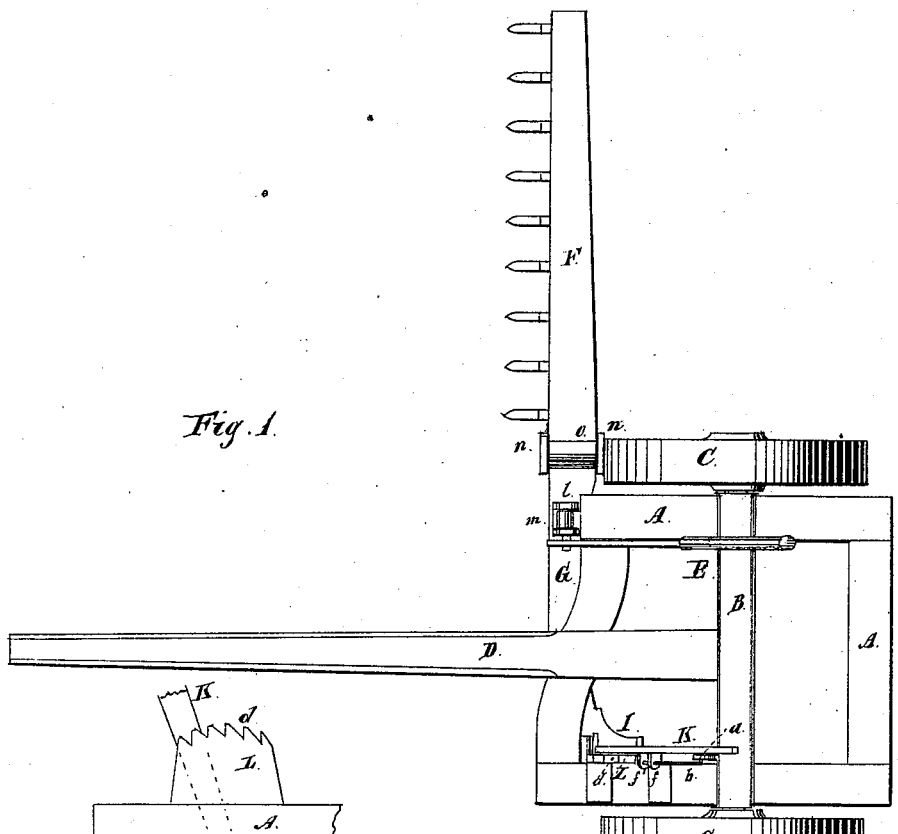
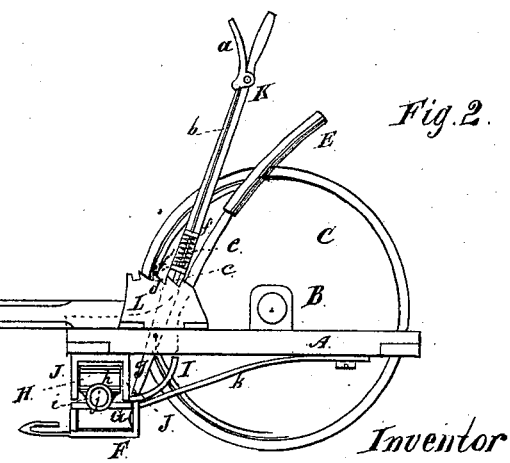
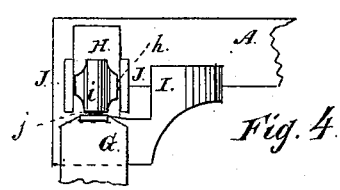
Witnesses:
Robert H. Dixon
Frank Hull
Inventor
John F. Steward

UNITED STATES PATENT OFFICE.

JOHN F. STEWARD, OF PLANO, ASSIGNOR TO ELIJAH H. GAMMON AND WILLIAM DEERING, OF CHICAGO, ILLINOIS.

IMPROVEMENT IN MOWERS.

Specification forming part of Letters Patent No. 197,500, dated November 27, 1877; application filed March 15, 1877.

*To all whom it may concern:*

Be it known that I, JOHN F. STEWARD, of Plano, Kendall county, State of Illinois, have invented a new and useful Improvement in Mowing-Machines, of which the following is a full description, reference being had to the accompanying drawings, in which—

Figure 1 is a top or plan view; Fig. 2, a side elevation, one of the wheels being removed; Figs. 3 and 4, enlarged details.

In operating mowing-machines which have the cutter-bar rigid, any clods or bogs or unevenness incidental to rough ground which the machine may meet are cut through, thereby dulling and otherwise injuring the cutting apparatus, and often clogging the same.

The object of this invention is to overcome this difficulty, which I accomplish by providing the inner end of the connecting-bar with a rearward extension, which acts as a lever, by means of which and suitable operating devices the front edge of the connecting-bar, and with it the front of the cutting apparatus, can be given an upward direction, so as to permit the sickle to ride over any obstruction, and not interfere with its operation.

In the drawings, A represents the main frame; B, the axle; C, the supporting-wheels; D, the tongue.

These parts A B C D are made in any of the well-known forms, and suitable gearing for operating the sickle and other devices for a complete mower are to be provided; but as such devices are of the usual construction, they are neither shown nor described.

E is the lever for raising the sickle, so as to pass stones and other large obstructions it may meet, and for traveling purposes. It is of the usual construction, and is pivoted to the frame and connected with the cutting apparatus in any well-known manner.

F is the ordinary finger bar or guard, in which the sickle operates as usual. It is provided with ears $n$ at its inner end, by means of which it is hinged at $o$ to the connecting-bar, so that it can be turned up out of the way when the machine is traveling from place to place.

G is the bar for connecting the cutting apparatus with the frame of the machine. As shown, it is held in place and steadied at its front end by means of the bar or brace $k$, the upper end of which is attached to the main frame. The lower end of this bar $k$ is provided with a socket, $m$, which fits between the ears $l$ on the bar G, and is held in place by means of a bolt or rivet, which passes through the ears and socket, so that the bar has a pivotal connection at this point. The other end of this bar G is provided with a trunnion, $j$.

H is a supporting-block, consisting of two parts, $h\ i$. The part $i$ is provided with a hole, in which the trunnion $j$ fits, so as to form a pivotal connection for the bar G at its inner end. The other portion, $h$, of the block H fits between the ears of the metal plate J, which plate is attached to the under side of the frame, and is held in place by means of a bolt, which passes through holes in $h$ and the ears of J. By thus constructing and attaching the bar G it has a vertical as well as a rolling motion.

I is a curved metal plate, projecting to the rear of the bar G, and forming a lever to raise the front of the bar. As shown, it is made separate from, and permanently attached to, the inner end of the bar; but it may be made a part thereof, if desired.

K is a lever, pivoted near its lower end to the frame A, and extending up so as to be within easy reach of the driver when on his seat. Near the upper end of this lever K is pivoted a small bell-crank lever, $a$, to which one end of the rod $b$ is attached, which rod extends down the side of the lever K, and at its other end is attached to a pawl, $c$; or the end of the rod itself may act as a pawl, which pawl is supported and operated in the ear or projection $f'$ on the lever K.

$e$ is a coil-spring around the rod $b$, one end of which is in contact with the ear $f$ on K, and the other end engages with the pawl $c$, and holds it down when engaged with the ratchet-teeth. L is a metal plate, secured to the frame A in any suitable manner. Its upper edge is provided with notches $d$, with which the pawl $c$ engages, and holds the lever K in any position in which it may be placed.

In use, when the machine is operating on ground that is level, the lever K is in the position shown in Fig. 2, in which position its lower end $g$ is out of contact with the plate I, so that the bar G and the cutting apparatus will remain in a horizontal position, and the parts will operate as usual.

When the machine is working on ground that is uneven, the driver takes hold of the lever K, disengages the pawl $c$ from its notch $d$ by means of the bell-crank lever $a$, and rod $b$ moves the lever K forward, carrying back its lower end $g$, which acts upon the curved plate or lever I, and raises the front edge of the connecting-bar G, and, through it, the front edge of the cutting apparatus, as shown in Fig. 3, in which position the cutter will ride over any obstruction it may meet and still perform its work.

By this arrangement the machine will operate equally as well on uneven ground as on even, and all clogging will be prevented, as the driver can, at any time, raise the sickle so as to allow it to ride over ridges and small hillocks, instead of cutting through them.

It is evident that the part or stop $g$ might be so arranged as to be operated by a foot-lever, and also that a cam-stop might be used in place of the form of stop shown, to operate as a means for raising the connecting-bar and preventing its falling; or an independent stop might be used to prevent its falling.

What I claim as new, and desire to secure by Letters Patent, is as follows:

The combination of the pivoted connecting-bar G, provided with an extension, I, located in line with the axis of vibration of bar G, and the lever K, operating directly upon said extension, substantially as described and set forth.

JOHN F. STEWARD.

Witnesses:
ROBERT H. DIXON,
FRANK LULL.